April 9, 1929.   A. G. GIRARD   1,708,613
VEHICLE SHIPPING DEVICE
Filed May 21, 1924
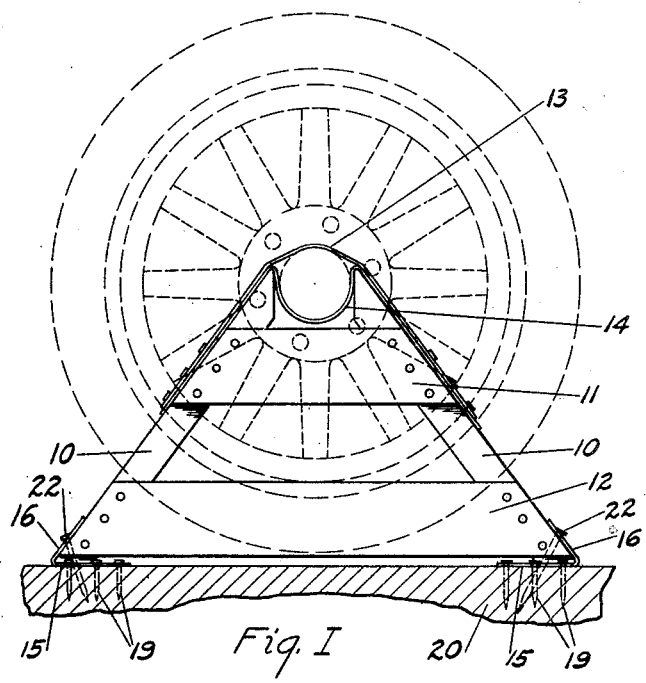
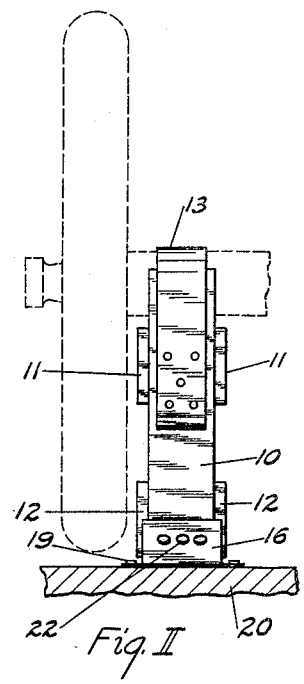
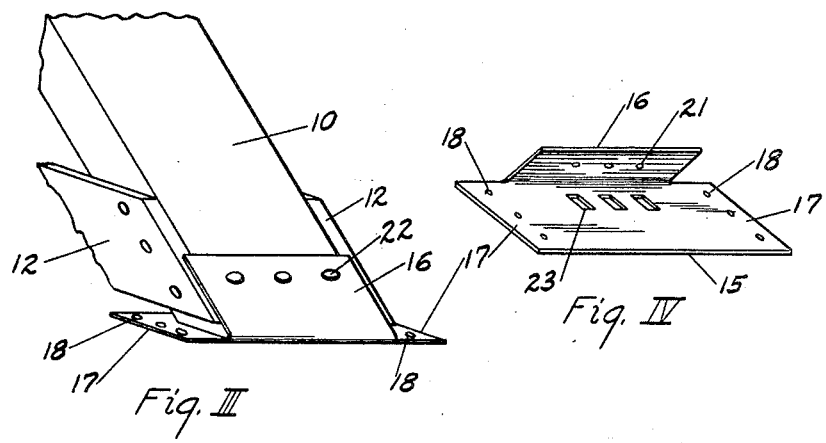
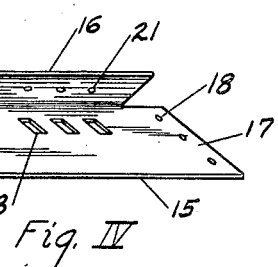
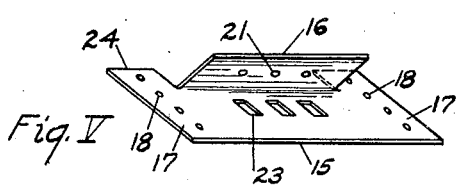
INVENTOR.
Arthur G. Girard
BY Solon J Broughton
ATTORNEY.

Patented Apr. 9, 1929.

1,708,613

UNITED STATES PATENT OFFICE.

ARTHUR G. GIRARD, OF TOLEDO, OHIO, ASSIGNOR TO THE WILLYS-OVERLAND COMPANY, OF TOLEDO, OHIO, A CORPORATION OF OHIO.

VEHICLE SHIPPING DEVICE.

Application filed May 21, 1924. Serial No. 714,912.

The present invention relates to vehicle shipping devices, and has for one of its objects to provide improved means for holding and bracing the vehicle on the floor or deck of a railway freight car in a manner to firmly secure it against displacement while enroute to its destination.

A further object of the invention is to provide an improved bracket for securing a vehicle supporting or bracing device to the floor or deck of a freight car.

Another object of the invention is to provide an improved securing bracket having angularly disposed portions adapted to receive the extremity of a brace or frame member with aligned holes in said portions, whereby to permit nails or the like to be driven therethrough and through the frame member into the floor or platform upon which the bracket is mounted, along with additional holes in the base of the bracket to receive screws or nails by which the bracket may be more firmly secured to the floor.

A further object is to provide an extremely simple and practical form of securing bracket which can be punched and shaped from a thin sheet of material at a relatively low cost, and which will be readily accessible for nailing purposes when placed in securing position upon the floor or deck of the freight car, or other shipping conveyance.

Other objects and advantages of the present invention will appear from the description to follow, taken in connection with the accompanying drawings, in which:

Figure I is a side elevation of an improved vehicle bracing and securing device.

Fig. II is an end elevation of the device shown in Fig. I.

Fig. III is a perspective view showing the manner of connecting the securing bracket with one of the frames for supporting and bracing the vehicle.

Fig. IV is a detail perspective view of the bracket shown in Fig. III, and

Fig. V is a detail perspective view of a slightly modified form of bracket.

Similar reference numerals refer to similar parts throughout the several views of the drawings.

The present invention discloses improved means for securing a vehicle supporting frame or brace of the type disclosed in my co-pending application, filed August 1st, 1922 and bearing Serial Number 578,882, said means being in the form of an improved bracket which is applicable to a single strut or brace member, as well as to the built-up frame herein disclosed, similar to that in said co-pending application. The frame comprises the two legs or struts 10 connected on the opposite sides by the upper and lower tie-members 11 and 12 respectively, as shown in Figs. I and II. At the top of the frame, two metal strips 13 and 14 are used, the latter having a depressed semi-circular portion between the ends of the struts 10 to receive the axle of the vehicle, and the former extending over the top of the axle, as shown in Fig. I, both strips being securely nailed to the outer faces of the struts 10, as clearly shown in the drawings.

The securing brackets for the frame each includes a base portion 15 and an upwardly inclined portion 16, the base portion having extended ends 17 projecting beyond the upstanding inclined portion and provided with a suitable number of holes 18 to receive the nails or screws 19 shown driven through both portions of the bracket and into the floor or deck 20 upon which the vehicle is mounted for shipment. It will be noted that the projected end portions 17 of the base extend slightly beyond the frame tie-members 12, far enough to permit the desired clearance in the driving of the nails 19 through the openings 18.

The upstanding portion 16 of the bracket is provided with a series of holes 21 adapted to receive the nails or spikes 22, and in order that the spikes may be driven through both portions of the bracket and into the floor 20, the base portion is provided with a series of relatively large slots or openings 23 aligned with the holes 21, which preferably extend transversely of the base to insure the passage of the spikes therethrough regardless of the angle at which they are driven with respect to the floor. If desired, a single opening may be cut in the base 15 large enough to permit all of the spikes to be driven through the base without fear of their striking the same.

In the modification shown in Fig. V, instead of cutting away the end portions of the upstanding member 16, they are left upon the base portion as indicated at 24, so that when the portion 16 is bent upwardly to the desired angle, the base projects upon the opposite sides of each end of the upstanding portion. By providing one or more holes in the laterally extending portions 24, a fewer number of holes will be required in the base portion 15, and hence the width of this portion may be reduced and a consequent saving in material effected.

The particular type of bracket shown and disclosed herein affords an extremely serviceable and satisfactory means for anchoring the vehicle supporting frame to the deck upon which the vehicle is mounted for shipment, and is adapted to hold it in position, regardless of the strains and stresses to which it may be subjected from time to time by the rough usage incident to the handling of the freight cars over long distances.

While I have shown in considerable detail, a specific embodiment of my invention, it is to be understood that this showing and description are illustrative only, and that I do not regard the invention as limited to the details of construction illustrated and described, except in so far as I have included such limitations within the terms of the following claim.

I claim as my invention:

In a bracket of the class described, the combination of a base portion and an inclined upstanding portion, said bracket being adapted to receive an inclined frame member between its base and upstanding portions, said upstanding portion having holes therethrough, said base portion having elongated openings therein in substantial alignment with the holes in the upstanding portion whereby nails or the like may be driven through both of said portions for securing said frame member therebetween, said base portion having integral extensions on opposite sides and contiguous therewith said extensions being provided with holes through which securing means may be driven.

In testimony whereof, I affix my signature.

ARTHUR G. GIRARD.